United States Patent
Yu (10) Patent No.: US 12,284,515 B2
(45) Date of Patent: Apr. 22, 2025

(54) PLATFORM SYSTEM FOR CONTROLLING VERTICAL SERVICE OF MOBILE COMMUNICATION NETWORK, AND METHOD FOR CONTROLLING SAME

(71) Applicant: Dong Ho Yu, Seoul (KR)

(72) Inventor: Dong Ho Yu, Seoul (KR)

(73) Assignee: Dong Ho Yu, Seoul (KR)

( * ) Notice: Subject to any disclaimer, the term of this patent is extended or adjusted under 35 U.S.C. 154(b) by 268 days.

(21) Appl. No.: 17/904,709

(22) PCT Filed: Feb. 18, 2021

(86) PCT No.: PCT/KR2021/002068
§ 371 (c)(1),
(2) Date: Aug. 19, 2022

(87) PCT Pub. No.: WO2021/167370
PCT Pub. Date: Aug. 26, 2021

(65) Prior Publication Data
US 2022/0417754 A1     Dec. 29, 2022

(30) Foreign Application Priority Data

Feb. 21, 2020 (KR) .......... 10-2020-0021363
Mar. 18, 2020 (KR) .......... 10-2020-0032950
Jan. 8, 2021 (KR) .......... 10-2021-0002730

(51) Int. Cl.
*H04W 12/06* (2021.01)
*H04L 9/40* (2022.01)
*H04W 12/37* (2021.01)

(52) U.S. Cl.
CPC .............. *H04W 12/06* (2013.01); *H04L 9/40* (2022.05); *H04W 12/37* (2021.01)

(58) Field of Classification Search
CPC .......... H04W 12/37; H04W 12/06; H04L 9/40
See application file for complete search history.

(56) References Cited

U.S. PATENT DOCUMENTS

2009/0059812 A1* 3/2009 Chinnaswamy .... H04L 41/5061
                                                        370/253
2011/0276447 A1* 11/2011 Paul ..................... G06Q 30/04
                                                        709/227

(Continued)

FOREIGN PATENT DOCUMENTS

KR   10-2018-0021630 A   3/2018
KR   10-2018-0114244 A   10/2018

(Continued)

OTHER PUBLICATIONS

GSA (Ericsson, Huawei, Nokia), '5G Network Slicing for Vertical Industries', Global mobile Suppliers Association, Sep. 2017 [Search Date: Jul. 19, 2021]. Web Address<https://www.huawei.com/en/technologyinsights/industry-insights/outlook/mobile-broadband/insights-reports/5g-network-slicing-vertical-industries.

(Continued)

*Primary Examiner* — Dhairya A Patel
*Assistant Examiner* — Eui H Kim
(74) *Attorney, Agent, or Firm* — BROADVIEW IP LAW, PC (57) ABSTRACT

A vertical control platform system according to the present invention comprises: a vertical welcome unit which, in response to a vertical service registration request made through a vertical app of a user terminal, authenticates a user's right to use each of a vertical server and a mobile communication operator network, generates a vertical credential, and provides the vertical credential to the user terminal; a vertical AAA unit which uses the vertical credential to perform user authentication when the vertical app is executed, and controls the connection between the user terminal and the vertical server through a network slice according to the result of the user authentication; and a (Continued)

vertical AF unit which performs an interface function for user authentication for a mobile communication operator.

8 Claims, 5 Drawing Sheets

(56) References Cited

U.S. PATENT DOCUMENTS

| | | | | |
|---|---|---|---|---|
| 2016/0036942 A1* | 2/2016 | Silva Filho | ............. | H04L 67/51 |
| | | | | 709/203 |
| 2018/0198830 A1* | 7/2018 | Wallis | ................. | H04L 65/1069 |
| 2019/0191309 A1* | 6/2019 | Kweon | ............. | H04M 15/8228 |
| 2020/0053083 A1* | 2/2020 | Kunz | .................... | H04W 12/72 |

FOREIGN PATENT DOCUMENTS

| | | |
|---|---|---|
| KR | 10-2019-0108371 A | 9/2019 |
| KR | 10-2019-0117697 A | 10/2019 |

OTHER PUBLICATIONS

International Search Report for PCT/KR2021/002068 by Korean Intellectual Property Office dated Jul. 27, 2021.

\* cited by examiner

PLATFORM SYSTEM FOR CONTROLLING VERTICAL SERVICE OF MOBILE COMMUNICATION NETWORK, AND METHOD FOR CONTROLLING SAME

CROSS-REFERENCE TO RELATED APPLICATIONS

This application is a National Phase Entry Application of PCT Application No. PCT/KR2021/002068 filed on Feb. 18, 2021, which claims priority to Korean Patent Application No. 10-2020-0021363 filed on Feb. 21, 2020, Korean Patent Application No. 10-2020-0032950 filed on Mar. 18, 2020, and Korean Patent Application No. 10-2021-0002730 filed on Jan. 8, 2021, in the Korean Intellectual Property Office, the entire contents of which are hereby incorporated by reference in its entirety.

TECHNICAL FIELD

The present invention relates to a vertical control platform system for controlling connection between a vertical server and a user terminal in a vertical application service of a mobile communication system supporting a network slice, and a control method thereof. More specifically, the present invention relates to a vertical control platform system for controlling connection between a vertical server and a user terminal by using authentication information of a subscriber using the vertical application service, and a control method thereof.

BACKGROUND ART

Recently, various techniques are adopted in mobile communication systems to meet rapidly increasing data traffic and demands for various services. Technical advancements, such as outstandingly fast speed and extremely low delay compared to those of existing 4G LTE, are achieved in 5th generation mobile communication services standardized currently, and the possibility of realizing mobile-based application services, such as V2X (autonomous driving vehicle), drone control, telemedicine, and the like impossible in the past, is gradually increasing on the basis of the advancements.

Meanwhile, in the existing 4G mobile communication systems, it is unable to guarantee the quality of a specific application service under the differentiated conditions since all subscribers in a network share common network resources. However, future applications pursued in the 5G mobile communication systems may operate only when the quality of service, such as transmission speed, response delay time of a communication network, or the like, is guaranteed more than a specific standard.

In order to distinguish such differentiated applications from the applications of the 4G mobile communication systems that horizontally share and provide the common network resources, applications that require a different network condition are referred to as vertical applications.

The 5th generation mobile communication systems adopt a virtualized network architecture to accommodate these vertical applications, and may allocate a network slice, which is a virtual closed network that satisfies specific network conditions such as a wide bandwidth, a fast response speed, and the like, to each vertical application service through the virtualized network architecture.

However, the 5G mobile communication systems only need to allocate and operate communication resources for the vertical applications, and do not need to provide a function of authenticating subscribers and setting rights of the subscribers to each of a large number of vertical applications.

In addition, since a service subscriber of a vertical application may be a user of a different mobile communication operator network, it is also not easy for a vertical application provider to authenticate whether the service subscriber has a right to use a network slice in his/her own mobile communication operator network.

Therefore, in order for a user terminal to use a vertical application in an allocated network slice, it needs to adopt a platform for authenticating whether the user terminal has a full right to use both the vertical service and allocated radio resource.

DISCLOSURE OF INVENTION

Technical Problem

Therefore, the present invention has been made in view of the above problems, and it is an object of the present invention to provide a vertical control platform system and a control method thereof, which can authenticate the right of a user to use a mobile communication operator network and the right to use a vertical service, without prior sharing of user information between a vertical server that provides the vertical service and the mobile communication operator network, and automatically share the results of the authentication to be used when the user is authenticated thereafter.

Another object of the present invention is to provide a vertical control platform system and a control method thereof, in which a vertical server generates and automatically installs a vertical credential of a user, of which the right to use a vertical service is confirmed, in a mobile communication terminal without exposing it to a mobile communication operator so that whenever a vertical service user accesses a network slice for the vertical service of a mobile communication operator network in the future, the vertical server may authenticate the access and collect information related to the access.

Technical Solution

To accomplish the above objects, according to one aspect of the present invention, there is provided a vertical control platform system comprising: a vertical welcome unit which, in response to a vertical service registration request made through a vertical app of a user terminal, authenticates a user's right to use each of a vertical server and a mobile communication operator network, generates a vertical credential, and provides t credential to the user terminal: a vertical AAA unit which uses the vertical credential to perform user authentication when the vertical app is executed, and controls connection between the user terminal and the vertical server through a network slice according to a result of the user authentication; and a vertical AF unit which performs an interface function for user authentication for a mobile communication operator.

According to another aspect of the present invention, there is provided a control method of a vertical control platform system, the method comprising the steps of: controlling user registration in response to a vertical service registration request transmitted through a vertical app installed in a user terminal; generating a vertical credential by authenticating a user's right to use the vertical service and the mobile communication operator network; providing the vertical credential to the user terminal; and performing, when the vertical app is executed, user authentication using the vertical credential, and controlling provision of the vertical service to the user terminal according to a result of the user authentication.

Advantageous Effects

According to an embodiment of the present invention, when a vertical control platform system collects results of performing user authentication on a mobile communication operator network and a vertical server and determines that the user has a right to use both of them, the vertical control platform system generates and automatically installs a vertical credential for the user in a user's terminal. The vertical credential is not shared with the mobile communication operator, and when the user accesses a network slice for a vertical service, the right to authenticate the user is entirely provided to a vertical operator who uses the vertical control platform system. Accordingly, the vertical operator may operate the vertical service as if it owns a virtual mobile communication network.

The vertical control platform may be operated simultaneously for a plurality of vertical services linked to the mobile communication operator network, and even in the case of a user using a plurality of vertical services through the credential for each vertical service, each vertical service is allowed to have a right to authenticate access to each network slice.

Each vertical service may directly control the right to use a network slice of mobile communication merely by separately confirming whether its user is registered as a member or has paid a fee.

Since the mobile communication operator does not need to know in advance the user's right to access a network slice for each vertical service, and only needs to deal with allocation of a network slice that the vertical operator desires to use, operation of the service is simplified greatly.

In addition, a user may conveniently use vertical services of high quality through the network slice only by subscribing a mobile communication operator network and a vertical service without the need of separately authenticating the rights to use the vertical server and the mobile communication operator network each other.

In addition, since a vertical service provider may use an integrated control by the vertical control platform system without going through user authentication processes between the mobile communication operator network and the vertical server, more efficient vertical service management is possible, and thus the operation burden is reduced.

It should be understood that the effects of the present invention are not limited to the effects described above, and include all effects that can be inferred from the configuration of the invention described in the detailed description or claims of the present invention.

BEST MODE FOR CARRYING OUT THE INVENTION

Hereinafter, the present invention will be described with reference to the accompanying drawings. However, the present invention may be implemented in several different forms, and thus is not limited to the embodiments described herein. In addition, in order to clearly explain the present invention in the drawings, parts unrelated to the description are omitted, and similar reference numerals are attached to similar parts throughout the specification.

Throughout the specification, when a part is "linked (connected, contacted, coupled)" to another part, it includes the cases of being "indirectly connected" with intervention of another member therebetween, as well as the cases of being "directly connected". In addition, when a part "includes" a certain component, this means that other components may be further provided rather than excluding other components unless clearly stated otherwise.

The terms used in this specification are used only to describe specific embodiments, and are not intended to limit the present invention. Singular expressions include plural expressions unless the context clearly dictates otherwise. It should be understood that in the present specification, terms such as "comprise" or "have" are intended to specify existence of a feature, number, step, operation, component, part, or combination thereof described in the specification, not to preclude the possibility of existence or addition of one or more other features, numbers, steps, operations, components, parts, or combinations thereof.

Figure 1:
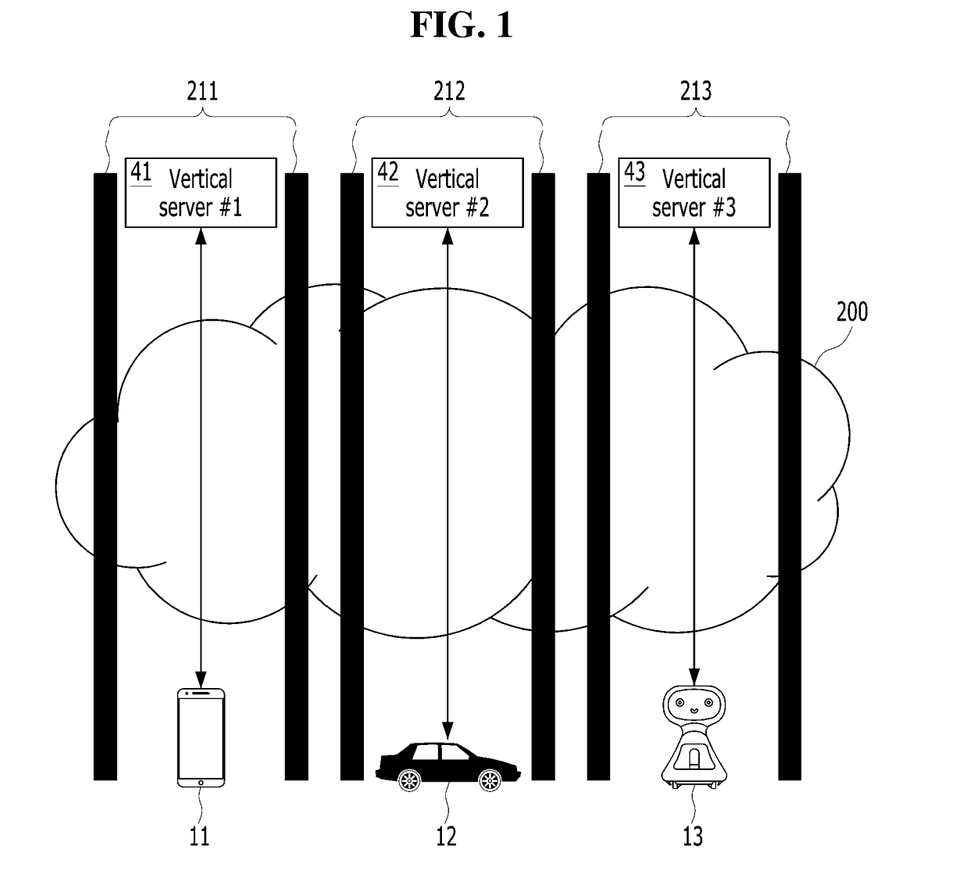
FIG. 1 is a view showing that a vertical service is provided to each user through a network slice of a mobile communication operator network.

Chapter 5.15 of TS23.501 of the 3rd Generation Partnership Project (3GPP), which establishes the 5G mobile communication system standards, provides network slicing (Chapter 5.15 of 3GPP TS23.501) for supporting vertical applications, and technical standards of each vertical application system that manages subscribers who access its own network slice through its own authentication system (Chapter 5.15.10 of 3GPP TS23.501) as shown in FIG. 1. A network slice is a network specialized for provisioning that satisfies a specific quality of service.

FIG. 1 is a view showing that a vertical service is provided to each user through a network slice of a mobile communication operator network.

A 5G mobile communication operator network 200 provides network slices that are specially allocated virtual closed networks. When a network slice is used, a communication service of a predetermined quality, such as high resolution, fast response time, or the like, may be provided.

Vertical application providers may be allocated with network slices from mobile communication operators, and provide differentiated vertical services. For example, a service specialized for a wireless terminal 11, an autonomous driving vehicle 12, a robot 13, or the like may be provided as a vertical service using a network slice 211, 212 and 213 respectively.

FIG. 1 shows that vertical servers 41 to 43 provide vertical services to user terminals 11 to 13 through allocated network slices 211 to 213, respectively.

A vertical application provider may provide a vertical service only to a user terminal 11 to 13 that is registered in the vertical service and has a right to use the network slice of the mobile communication operator network 200.

However, it is difficult for the vertical application provider to confirm whether a user registered in the vertical service has a right to use the mobile communication operator network 200, and it is also difficult for a mobile communication operator to confirm whether a large number of vertical service users using its own mobile communication operator network 200 are legitimate users. This is since that although a vertical application provider usually communicates with a subscriber to be independent from a mobile communication operator network based on an app or an Internet protocol, the subscriber should have a right to use the mobile communication operator network to use the vertical service.

For example, a subscriber authentication system independent from the mobile communication operator is required in order for the vertical application provider to smoothly authenticate subscribers and provide services through the network slices 211 to 213, and in order to provide a complete vertical service, it needs to authenticate a right to use the mobile communication network, as well as a right to use the service.

Although only three network slices 211 to 213 are shown in FIG. 1, mobile communication operators may operate a much larger number of network slices.

Figure 2:
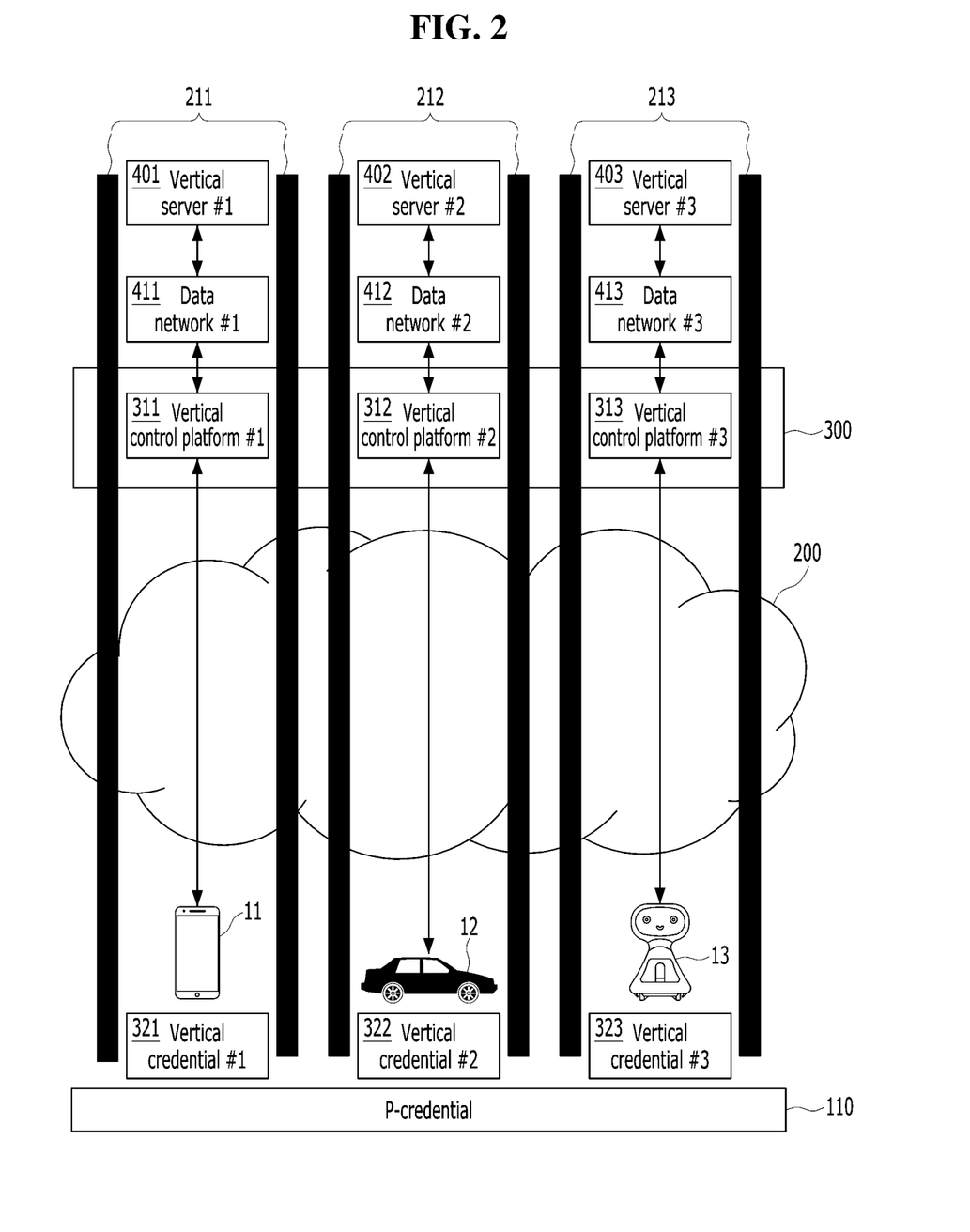
FIG. 2 is a view showing an outline of a vertical control platform system according to an embodiment of the present invention.

FIG. 2 is a view showing an outline of a vertical control platform system according to an embodiment of the present invention.

A user of the mobile communication operator network 200 is provided with a P-credential 110 in advance in the form of a USIM or the like from the mobile communication operator as authentication information for using the mobile communication operator network 200. The P-credential 110 indicates a main credential referred to as a subscriber permanent identifier (SUPI) or the like in 3GPP, and includes mobile subscriber identification information and network identification information. The P-credential 110 is globally unique identification information assigned to each subscriber of the mobile communication operator network 200. A user terminal having the P-credential 110 may access the mobile communication operator network 200 without a separate operation.

However, in order for a subscriber of the mobile communication operator network 200 to use a vertical service, separate authentication information is required. This authentication information is qualification information for proving that the user has a right to access the network slice as a subscriber of both the mobile communication operator network 200 and the vertical service, and hereinafter, this will be referred to as a vertical credential 321 to 323.

A vertical control platform system 300 may include a plurality of vertical control platforms 311 to 313. Each of the vertical control platforms 311 to 313 is connected between a network slice 211 to 213 and a vertical server 401 to 403, and provides a vertical credential 321 to 323 as network slice access qualification information provided to a user who subscribes both the vertical service and the mobile communication operator network 200.

When user authentication for the vertical service and the mobile communication network is completed, the vertical control platform 311 to 313 issues a vertical credential 321 to 323, and stores the vertical credential in its own storage space and shares the vertical credential with the user terminal 11 to 13 at the same time. The user terminal 11 to 13 automatically stores the vertical credential 321 to 323.

A user 11 to 13 having the vertical credential 321 to 323 may be provided with a unique vertical service transmitted from the vertical server 401 to 403 through the data network 411 to 413.

The vertical control platform system 300 may operate simultaneously for a plurality of vertical services linked to the mobile communication operator network 200. Accordingly, when a user uses a plurality of vertical services, the vertical control platform system 300 grants a right to authenticate access to a network slice through the vertical credential to each of corresponding vertical operators.

Figure 3:
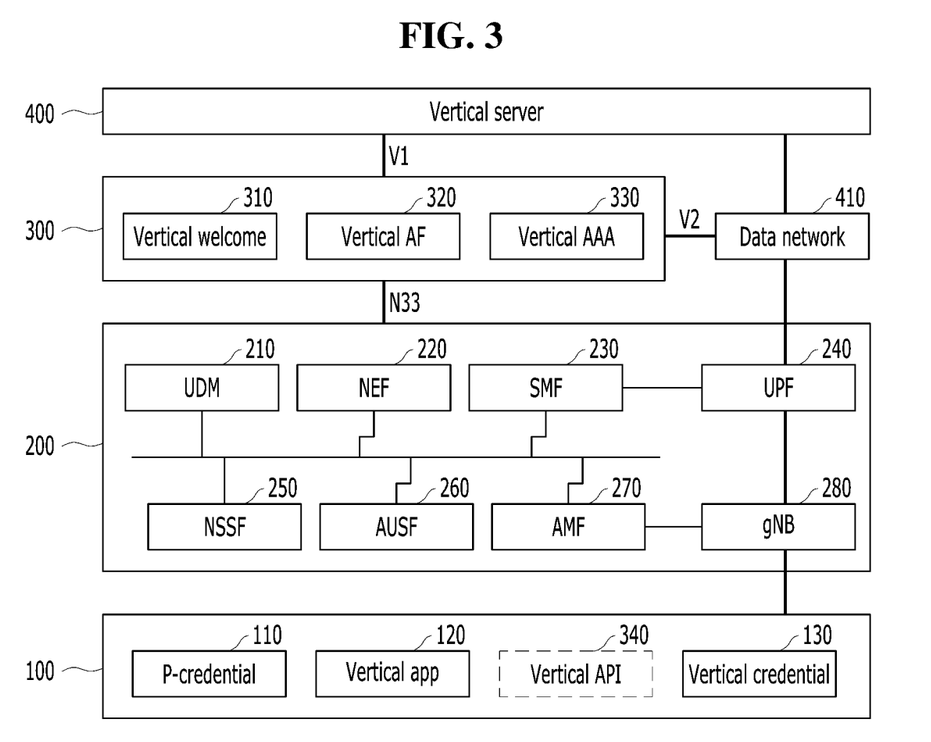
FIG. 3 is a view showing a connection relation between a vertical control platform system, a mobile communication operator network, and a user terminal according to an embodiment of the present invention.

FIG. 3 is a view showing a connection relation of a vertical control platform system, a mobile communication operator network, and a user terminal according to an embodiment of the present invention.

The user terminal 100 includes a P-credential 110 and a vertical app 120, which are provided in advance when a user subscribes a mobile communication network.

The mobile communication operator network 200 includes a unified data management (UDM) unit 210, a network exposure function (NEF) unit 220, a service management function (SMF) unit 230, a user plane function (UPF) unit 240, a network slicing selection function (NSSF) unit 250, an authentication server function (AUSF) unit 260, an access and mobility management function (AMF) unit 270, and a next generation node B (gNB) 280. Each of the modules 210 to 280 is a device that cites the 3GPP standards, and are involved in the operation, communication, and control of the mobile communication operator network 200.

The vertical control platform system 300 is connected between the mobile communication operator network 200 and the vertical server 400, and includes a vertical welcome 310, a vertical application function (AF) 320, and a vertical authentication authorization accounting (AAA) 330.

The vertical welcome 310, the vertical AF 320, and the vertical AAA 330 may be implemented in the form of an instance respectively to be implemented as a physical or logical group for each supported vertical service.

That is, the vertical control platform system 300 may be implemented as a physical platform device for each vertical service or may be implemented as a logical platform in the cloud. The vertical welcome 310, the vertical AF 320, and the vertical AAA 330 are implemented in the form of software or a module specialized for a supported vertical service, and perform operations described below.

When the vertical app 120 is installed in the user terminal 100, a vertical API 340 is also installed. When the user terminal 100 sends a signal requesting registration of a vertical service to the vertical welcome 310 or when the vertical welcome 320 provides a vertical credential 130 to the user terminal 100, the vertical API 340 is used for a call between the user terminal 100 and the vertical welcome 310 to transmit the signal. The vertical welcome 310 provides the vertical API 340 when the vertical app 120 is installed. The vertical API 340 may be provided in the form of a RESTful API, or in the form of a library embedded in the vertical app 120. However, when the vertical API 340 is provided in the form of a RESTful API, the vertical app 120 that supports a standard web interface may use it easily.

When a user who has installed the vertical app 120 requests registration of a vertical service, the vertical welcome 310 controls a user registration process between the user terminal 100 and the vertical server 400.

Describing in more detail, when a user requests registration of a vertical service through the vertical app 120, the vertical API 340 installed in the user terminal 100 calls the vertical welcome 310. The vertical welcome 310 transfers the vertical service registration request signal transmitted from the user terminal 100 to the vertical server 400. The vertical server 400 performs user registration after authenticating the right of the user for using the vertical service. When authentication of the right of the user fails, the vertical service registration request is rejected. When registration of the user is normally completed, the vertical server 400 generates a user token for notifying success of the registration of the user and transmits the user token to the vertical welcome 310. When authentication of the right of the user fails, the vertical server 400 transmits details of the failure to the vertical welcome 310.

The vertical welcome 310 receiving the user token from the vertical server 400 requests authentication of the subscriber from the mobile communication operator network 200 to confirm whether the vertical service subscriber is a subscriber of the mobile communication operator network 200.

At this point, the mobile communication operator network 200, which receives a request for a user token from the vertical welcome 310, is a mobile communication network that provides a network slice allocated to the vertical application provider for provision of a vertical service. The mobile communication operator network 200 authenticates that the corresponding vertical service subscriber is its own mobile communication network subscriber, generates a user token indicating that the authentication is successful, and transmits the generated user token to the vertical welcome 310.

The vertical application provider may normally provide the vertical service through the network slice only when the vertical service subscriber has a right to use the corresponding mobile communication operator network 200. Therefore, the vertical welcome 320 needs to perform a process of confirming that the user has a right to use both the vertical service and the mobile communication operator network 200 at the same time.

The vertical welcome 310 provides the vertical app network slice information of the corresponding vertical service subscriber to the mobile communication operator network 200 to be updated in response to the user token of the mobile communication operator network 200. As described below in detail, the mobile communication operator network 200 stores the vertical app network slice information in a unified data repository (UDR) unit. Here, the vertical app network slice information is Network Slice Selection Assistance Information (S-NSSAI), which is information on a network slice allocated to the vertical app subscribed by a corresponding user. This information is provided in advance to inform the mobile communication operator network 200 so that the user may access the network slice in the future.

In addition, the vertical welcome 310 generates a vertical credential 130 in response to the user token of the mobile communication operator network 200. The vertical welcome 310 transmits the vertical credential 130 to the vertical AAA 330 to be stored in the storage space of the vertical AAA 330, and also transmits the same vertical credential 130 to the user terminal 100 to be shared with the user terminal 100. Here, the vertical API 340 may be used to transmit the vertical credential 130 between the vertical welcome 320 and the user terminal 100.

Since the vertical welcome 310 is connected between the mobile communication operator network 200 and the vertical server 400, and integrally performs authentication of the right to use for each of the mobile communication operator network 200 and the vertical server 400 as described above, it does not need to authenticate the right to use with each other between the mobile communication operator network 200 and the vertical server 400.

The vertical credential 130 is qualification information for proving that the user has a right to access the network slice as a subscriber of the vertical service and the mobile communication operator network 200.

The vertical AF 320 involves in data transmission between the vertical control platform system 300 and the mobile communication operator network 200 and data transmission between the vertical control platform system 300 and the vertical server 400. The vertical control platform system 300 and the mobile communication operator network 200 communicate through the vertical AF 320 and the NEF unit 220.

Since several modules of the mobile communication operator network 200 are not exposed to the outside, the network exposure function (NEF) unit 220 is provided for the sake of communication with the outside, and in the vertical control platform system 300, the vertical AF 320 is provided for communication with the outside. Here, the NEF unit 220 may communicate with an external application function (AF) unit using an N33 interface, and the vertical AF 320 is compatible with the AF interface of 3GPP.

The vertical AAA 330 receives the vertical credential 130 from the vertical welcome 320 and stores it in the database. Thereafter, when the vertical service subscriber executes the vertical app 120 to use the vertical service, the vertical AAA 330 performs functions such as subscriber authentication, authorization, and accounting by using the vertical credential 130, and controls connection between the vertical server 400 and the user terminal 100 through the network slice.

The vertical AAA 330 compares its own vertical credential with the vertical credential stored in the user terminal 100, and when the two vertical credentials are the same, it may authenticate that the user who has executed the vertical app is a person who has a right to use both the mobile communication operator network 200 and the vertical service, and thus has a right to access the network slice used for providing the vertical service. When the vertical AAA 330 succeeds in user authentication using the vertical credential, it connects the user terminal 100 to the network slice. In addition, the vertical AAA 330 controls the vertical server 400 to provide the vertical service to the user terminal 100 through a data network 410. That is, the vertical AAA 330 controls the connection between the user terminal 100 and the vertical server 400 according to a result of user authentication performed using the vertical credential.

Meanwhile, the accounting function of the vertical AAA 330 is a function of receiving various information provided by the mobile communication operator network 200 in relation to access of a subscriber, and providing the information for the vertical service through the vertical server 400. The vertical AAA 330 may operate using an authentication algorithm based on an extensible authentication protocol (EAP).

The vertical server 400 provides data for vertical service, subscriber management, and the like. The vertical server 400 provides a predetermined vertical service to the user terminal 100 through the data network 410 in response to a service request signal of the vertical AAA 330.

As described above, the vertical credential 130 is common authentication information generated according to a result of user authentication on the mobile communication operator network 200 and the vertical service, and as the authentication information is shared and utilized among devices, the user authentication process is simplified without the need of confirming a right to use the mobile communication operator network 200 and the vertical service whenever the vertical app is used.

Figure 4:
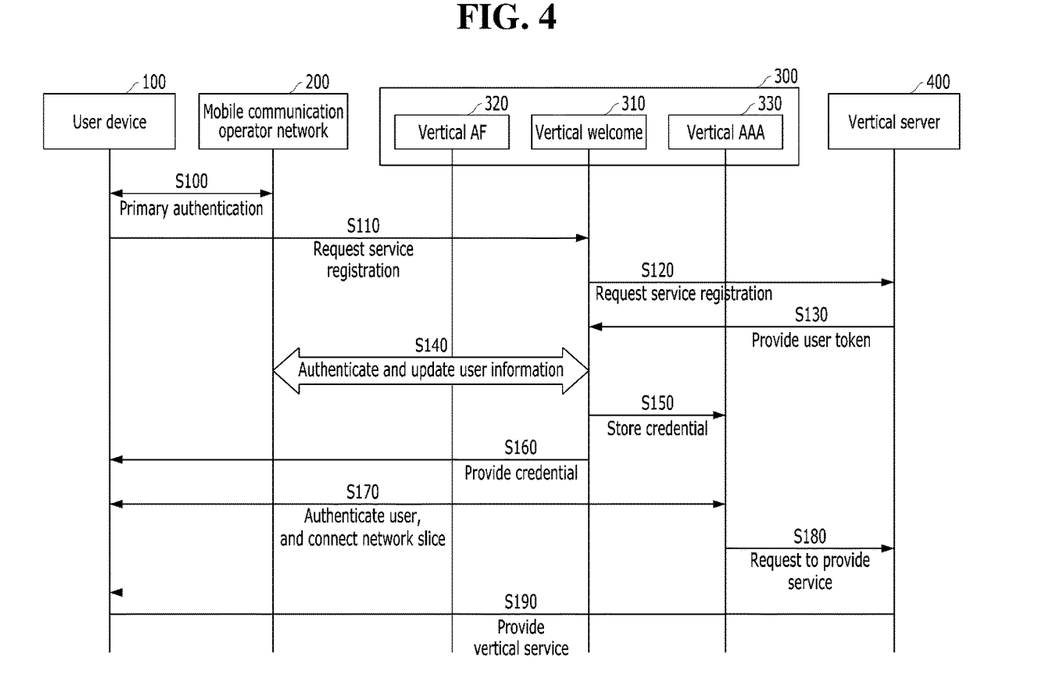
FIG. 4 is a signal flow diagram illustrating an integrated control operation of a vertical control platform system according to an embodiment of the present invention.

FIG. 4 is a signal flow diagram illustrating an integrated control operation of a vertical control platform system according to an embodiment of the present invention.

At step S100, the user terminal 100 performs primary authentication to access the mobile communication operator network 200. The user's right to use the corresponding mobile communication operator network 200 is authenticated through the P-credential stored in the user terminal 100. As described below in detail, when a user is authenticated to have a right to use, the mobile communication operator network 200 generates information for continuously maintaining the authentication qualification by using an authentication server function (AUSF) and store it in a unified data repository (UDR). At this point, the same information for maintaining the authentication qualification is also copied to the USIM of the user terminal 100. Here, the user terminal 100 includes various types of devices capable of communicating through a mobile communication network, such as a mobile communication terminal, an autonomous driving vehicle, a robot, and the like.

At step S110, when a user desires to receive a 5G-based vertical service through a network slice, the user downloads and installs a vertical app in the user terminal 100, and requests registration of a vertical service through the vertical app. When the vertical app is installed, the vertical API provided by the vertical welcome 310 is also installed in the user terminal 100. The vertical API is used for a call between the vertical welcome 310 and the user terminal 100 to transmit signals between the vertical welcome 310 and the user terminal 100. Meanwhile, a service registration request signal is transmitted to the vertical welcome 310 of the vertical control system 300 through the mobile communication operator network 200.

At step S120, the vertical welcome 310 transfers the service registration request signal of the user terminal 100 to the vertical server 400.

At step S130, the vertical server 400 performs registration of the vertical service in response to the service registration request signal transferred through the vertical welcome 310, and when the registration is normally completed, the vertical server 400 generates and provides a user token to the vertical welcome 310. The user token is authentication information indicating that the user is a subscriber who has a right to use the vertical service. Here, the user registration request signal may include personal information of the user who desires registration.

At step S140, the vertical welcome 320 requests the mobile communication operator network 200 to authenticate the vertical service subscriber's right to use the mobile communication operator network 200 through the vertical AF 320 in response to the user token of the vertical server 400. As described above, since the vertical service is provided through a network slice, the user should be a subscriber of both the vertical service and the mobile communication operator network 200 to normally receive the vertical service.

When the vertical service subscriber is authenticated as a subscriber of the mobile communication operator network 200, the vertical welcome 310 provides vertical app network slice information of the corresponding subscriber to the mobile communication operator network 200 to be updated.

Through step S140, the vertical control platform system 300 may confirm whether the user has a right to use both the vertical service and the mobile communication operator network 200. The detailed operation of step S140 will be described below with reference to FIG. 5.

At step S150, the vertical welcome 310 confirms the user's right to use the mobile communication operator network 200 and the vertical service, and generates a vertical credential, which is qualification information for proving the right to use the network slice. In addition, the vertical welcome 310 stores the vertical credential in a storage space of the vertical AAA 330.

At step S160, the vertical welcome 310 provides a vertical credential the same as the one stored in the vertical AAA 330 to the user terminal 100, and the user terminal 100 stores the vertical credential. As shown in FIG. 3, in order for the vertical AAA 330 to authenticate a user when a vertical service subscriber executes the vertical app, the vertical AAA 330 and the user terminal 100 should have the same vertical credential to verify each other.

At step S170, when the user registered in the vertical service executes the vertical app, the vertical AAA 330 authenticates the user using the vertical credentials stored in its storage space and the user terminal 100. Then, when the authentication is successful, the vertical AAA 330 connects the user terminal 100 to the network slice.

At step S180, when the authentication is successful, the vertical AAA 330 transmits a service request signal to the vertical server 400 to control provision of the vertical service.

At step S190, the vertical server 400 provides the vertical service to the user terminal 100 in response to the service request signal of the vertical AAA 330.

As described above, the user terminal 100 provided with a vertical credential may be simply provided with a vertical service thereafter using a network slice only through the user authentication process of the vertical AAA 330 without a separate registration process.

Figure 5:
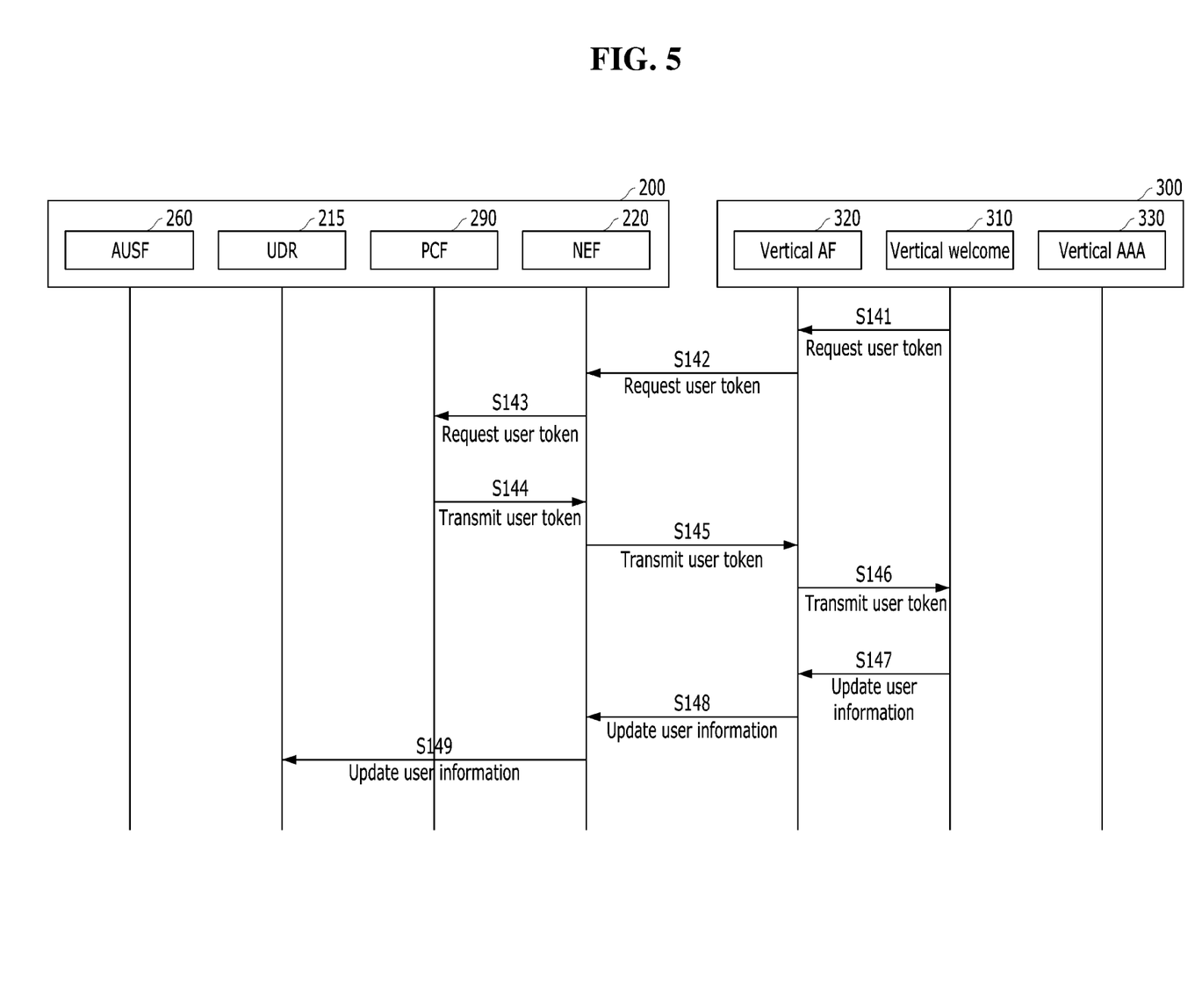
FIG. 5 is a signal flow diagram illustrating a user authentication and update operation in a mobile communication network according to an embodiment of the present invention.

FIG. 5 is a signal flow diagram illustrating a user authentication and update operation in a mobile communication network according to an embodiment of the present invention.

At step S141, the vertical welcome 310 generates a user token request signal and transmits it to the vertical AF 320 in order to confirm whether a user registered in a vertical service is a subscriber of the mobile communication operator network 200.

At step S142, the vertical AF 320 transmits the user token request signal of the vertical welcome 310 to the network exposure function (NEF) unit 220 of the mobile communication operator network 200.

At step S143, the NEF unit 220 transmits the user token request signal to a policy control function (PCF) unit 290.

At step S144, the PCF unit 290 authenticates the vertical service subscriber's right to use the mobile communication operator network 200 in response to the user token request signal of the vertical welcome 310. When the authentication is successful, the PCF unit 290 generates a user token and transmits it to the NEF unit 220.

At step S145, the NEF unit 220 transmits the user token to the vertical AF 320 of the vertical control platform system 300.

At step S146, the vertical AF 320 transfers the user token received from the mobile communication operator network 200 to the vertical welcome 310.

At step S147, the vertical welcome 310 confirms that the vertical service subscriber has a right to use the corresponding mobile communication operator network 200 through the user token. Accordingly, the vertical welcome 310 transmits a network slice allocated to the vertical app and user information about the user's right to use the network slice to the vertical AF 320 to update in the mobile communication operator network 200.

At step S148, the vertical AF 320 transmits the received user information to the NEF unit 220 of the mobile communication operator network 200.

At step S149, the NEF unit 220 transfers the user information received from the vertical control platform system 300 to the unified data repository (UDR) unit 280 to be stored. This user information may be used for user authentication thereafter when the user accesses a network slice allocated by the mobile communication operator network 200.

Although not shown in FIG. 5, after registration of the vertical service is completed, the vertical AAA 330 of the vertical control platform system 300 may connect the user terminal 100 and the vertical server 400 through a network slice by simply performing user authentication using the vertical credentials stored in its own storage space and the user terminal 100, whenever a subscriber executes a vertical app to use the vertical service.

The vertical AAA 330 compares the vertical credential stored in its storage space with the vertical credential stored in the user terminal 100, and connects the user terminal to the network slice when the vertical credentials are the same. Then, the vertical server controls to provide a vertical service to the user terminal.

As described above, the vertical control platform system provided in the present invention controls registration of a vertical service between the user terminal and the vertical server. Then, the vertical control platform system confirms whether the subscriber is a subscriber of both the vertical server and the mobile communication operator network, updates the network slice information of the corresponding vertical service in the mobile communication operator network, and generates and shares a vertical credential between its own storage space and the user terminal. Accordingly, the vertical control platform system simplifies the user authentication process by using the vertical credentials, and controls connection between the user terminal and the vertical server through the network slice, without the need of confirming the user's right to use the mobile communication operator and the vertical service whenever the vertical app is executed.

In addition, as the vertical API is installed in the user terminal when the vertical app is installed, signal transmission between the user terminal and the vertical control platform system is performed smoothly by the vertical API when registration of a vertical service, sharing of a vertical credential, and the like of the user are performed between the vertical server, the mobile communication operator network, and the user terminal.

The method according to an embodiment of the present invention described above may be implemented in the form of program instructions that can be executed through various computer components, and recorded in a computer-readable recording medium. The computer-readable recording medium may include program instructions, data files, data structures, and the like alone or in combination. The program instructions recorded in the computer-readable recording medium may be specially designed and configured for the embodiments of the present invention, or may be known and available to those skilled in the art of computer software field. The computer-readable recording medium includes hardware configured to store and execute program instructions, such as a magnetic recording medium including a hard disk, a floppy disk, and a magnetic tape, an optical recording medium including a CD-ROM and a DVD, a magneto-optical medium including a floptical disk, ROM, RAM, flash memory, and the like. The program instructions include machine codes generated by a compiler, and high-level language codes that can be executed in a computer using an interpreter. The hardware may be configured to operate by one or more software modules to process the method according to the present invention, and vice versa.

The method according to an embodiment of the present invention may be executed in an electronic device in the form of a program instruction. The electronic device includes a portable communication device such as a smart phone, a smart pad or the like, a computer device, a portable multimedia device, a portable medical device, a camera, a wearable device, and a home appliance device.

The method according to an embodiment of the present invention may be provided to be included in a computer program product. The computer program product is a merchandise and may be traded between sellers and buyers. The computer program product may be distributed in the form of a device-readable recording medium or online through an application store. In the case of online distribution, at least some of the computer program products may be temporarily stored or temporarily generated in a storage medium such as a memory of a manufacturer server, an application store server, or a relay server.

Each of the components, for example, a module or a program, according to an embodiment of the present invention may be configured as a single sub-component or a plurality of sub-components, and some of the sub-components may be omitted, or other sub-components may be further included. Some components (modules or programs) may be integrated into a single entity to perform the same or similar functions performed by each corresponding component before the integration. Operations performed by the modules, programs, or other components according to an embodiment of the present invention may be executed sequentially, in parallel, repetitively, or heuristically, or at least some of the operations may be executed in a different order or omitted, or other operations may be added.

The description of the present invention described above is for illustrative purposes, and those skilled in the art may understand that it can be easily modified into other specific forms without changing the technical spirit or essential features of the present invention. Therefore, it should be understood that the embodiments described above are illustrative in all respects and not restrictive. For example, each component described as a single type may be implemented in a distributed form, and components described as distributed may also be implemented in a combined form likewise.

The scope of the present invention is indicated by the following claims, and all changes or modifications derived from the meaning and scope of the claims and their equivalents should be construed as being included in the scope of the present invention.

The invention claimed is:

1. A vertical control platform system comprising:
 a processor connected to vertical servers via a mobile operator network, wherein the vertical servers provide differentiated vertical services and which provide access qualification information to a user who subscribes to both the differentiated vertical services and the mobile communication operator network; and
 a memory connected to the processor, and wherein the processor is configured to cause:
a vertical welcome unit, in response to a vertical service registration request made through a vertical app of a user terminal, to authenticate a user's right to use a respective vertical server of the vertical servers and the mobile communication operator network to generate a vertical credential, and transmit the vertical credential to the user terminal;
a vertical AAA unit which uses the vertical credential to perform user authentication when the vertical app is executed, and controls connection between the user terminal and the respective vertical server through a network slice according to a result of the user authentication; and
a vertical AF unit to perform an interface function for user authentication for a mobile communication operator,
wherein the processor is configured to cause the vertical welcome unit to receive a first token for authenticating a right to use a vertical service from the respective vertical server, receive a second token for authenticating a right for a user of the first token to use the mobile communication operator network through the vertical AF unit, and update user information about a right to use the network slice in the mobile communication operator network,
wherein the vertical credential includes qualification information for proving that the user has a right to access the network slice as a subscriber of both the mobile communication operator network and the vertical service based on the first token and the second token,
wherein the processor is configured to cause the vertical welcome unit to request, when a user is normally registered in a vertical service, the mobile communication operator network to authenticate the registered user's right to use the mobile communication operator network in response to a user token transmitted from the respective vertical server in order to generate the vertical credential, and
wherein the processor is configured to cause the vertical AAA unit to compare a vertical credential stored in its own storage space with the vertical credential stored in the user terminal when the vertical app is executed, and control the respective vertical server to provide a vertical service to the user terminal through the network slice when the vertical credentials are the same.

2. The system according to claim 1, wherein the processor is configured to cause the vertical welcome unit to transfer the vertical service registration request to the respective vertical server.

3. The system according to claim 1, wherein the processor is configured to cause the vertical welcome unit to provide a vertical API used for a call between the vertical welcome unit and the user terminal to the user terminal, when the vertical app is installed in the user terminal.

4. The system according to claim 1, wherein the processor is configured to cause, when the user has a right to use the respective vertical server and the mobile communication operator network at the same time, the vertical welcome unit to update vertical app network slice information of the user in the mobile communication operator network.

5. A control method of a vertical control platform system which is connected to vertical servers providing differentiated vertical services and which provides access qualification information to a user who subscribes both the differentiated vertical services and the mobile communication operator network, the method comprising:
controlling user registration in response to a vertical service registration request transmitted through a vertical app installed in a user terminal;
receiving a first token for authenticating a right to use a vertical service from a respective vertical server of the vertical servers;
receiving a second token for authenticating a right for a user of the first token to use the mobile communication operator network;
updating user information about a right to use the network slice in the mobile communication operator network;
storing a vertical credential corresponding to qualification information for proving that the user has a right to access the network slice as a subscriber of both the mobile communication operator network and the vertical service based on the first token and the second token;
providing the vertical credential to the user terminal; and
performing, when the vertical app is executed, user authentication using the vertical credential, and controlling provision of the vertical service to the user terminal according to a result of the user authentication,
wherein the method further comprises:
requesting, after the user is normally registered in the vertical service, the mobile communication operator network to authenticate the registered user's right to use the mobile communication operator network in response to a user token transmitted from the respective vertical server in order to generate the vertical credential; and
comparing the vertical credential of the vertical control platform system itself with the vertical credential of the user terminal when the vertical app is executed, and controlling to provide the vertical service to the user terminal when the vertical credentials are the same.

6. The method according to claim 5, further comprising the step of providing a vertical API to the user terminal, when the vertical app is installed in the user terminal.

7. The method according to claim 6, wherein the vertical API is used for a call between the vertical control platform system and the user terminal.

8. The method according to claim 5, further comprising the step of receiving and transferring a vertical service registration request to a respective vertical server that provides the vertical service, by the vertical control platform system.

* * * * *